United States Patent
Silverman et al.

(10) Patent No.: US 6,260,025 B1
(45) Date of Patent: *Jul. 10, 2001

(54) DISTRIBUTED MATCHING SYSTEM FOR DISPLAYING A BOOK OF CREDIT FILTERED BIDS AND OFFERS

(75) Inventors: David L. Silverman, Saint James; Jack W. Hoffman, Longbeach, both of NY (US)

(73) Assignee: Geneva Branch of Reuters Transaction Services Ltd. (CH)

(*) Notice: Subject to any disclaimer, the term of this patent is extended or adjusted under 35 U.S.C. 154(b) by 0 days.

This patent is subject to a terminal disclaimer.

(21) Appl. No.: 09/352,130

(22) Filed: Jul. 13, 1999

Related U.S. Application Data (63) Continuation of application No. 08/654,685, filed on May 29, 1996, now Pat. No. 5,924,083.

(51) Int. Cl.$^7$ .................................................. G06F 17/60
(52) U.S. Cl. .................................................. 705/37
(58) Field of Search ........................ 705/37.1, 10.14, 705/35.38; 340/825.26, 825.27

(56) References Cited

U.S. PATENT DOCUMENTS

| | | | |
|---|---|---|---|
| 3,573,747 | * | 4/1971 | Adams et al. . |
| 4,376,978 | * | 3/1983 | Musmano . |
| 4,412,287 | * | 10/1983 | Braddock, III . |
| 4,745,559 | * | 5/1988 | Willis et al. . |
| 4,750,135 | * | 6/1988 | Boilen . |
| 4,903,201 | * | 2/1990 | Wagner . |
| 5,077,665 | * | 12/1991 | Silverman et al. .................... 705/37 |
| 5,136,501 | * | 8/1992 | Silverman ............................ 705/37 |
| 5,375,055 | * | 12/1994 | Togher et al. ........................ 705/37 |
| 5,924,083 | * | 7/1999 | Silverman et al. .................... 705/37 |

FOREIGN PATENT DOCUMENTS

99/19821 * 4/1999 (WO) .

OTHER PUBLICATIONS

Hart, "Managing credit and market risk as a buyer of credit derivatives", Journal of Commercial Lending, v78, n3, p38(6), Nov. 1995, Dialog file 148, Acession No. 09646503.*

* cited by examiner

Primary Examiner—Frantzy Poinvil
(74) Attorney, Agent, or Firm—Banner & Witcoff, Ltd.

(57) ABSTRACT

A distributed electronic trading system for displaying a real-time credit filtered view of at least one market in which financial instruments are traded in which the market view includes a predetermined number of orders currently available to a viewing trading entity based upon one or more credit limits entered by the viewing trading entities and/or other trading entities in the system includes a host for receiving and storing orders and credit information entered by a plurality of trading entities including the viewing trading entity, for transmitting the orders and predetermined display parameters, and for selectively transmitting the credit information; a plurality of intelligent nodes linked to the host; and a plurality of keystations respectively linked to one or more of the intelligent nodes. Each intelligent node includes a credit information storage unit for storing the selected credit information, an order book storage unit for storing the orders and display parameters, and a processor for generating real-time credit filtered market view display information for each assigned trading entity. The real-time credit filtered market view display information includes the predetermined number of unilaterally and/or bilaterally credit filtered orders and corresponding available quantities. The displayed market view may consist of individual order prices and quantities, aggregated prices and quantities, and/or average prices at predetermined quantities chosen by the viewing trading entity.

31 Claims, 3 Drawing Sheets

DISTRIBUTED MATCHING SYSTEM FOR DISPLAYING A BOOK OF CREDIT FILTERED BIDS AND OFFERS

This application is a continuation of Ser. No. 08/654,685 filed May 29, 1996 now U.S. Pat. No. 5,924,083.

FIELD OF THE INVENTION

The present invention relates to a distributed matching system which generates and provides to trading entities a market view display including a predetermined number of bids and offers of multiple trading instruments available to each individual trading entity based on unilateral and/or bilateral credit availability between the offeror/bidder and the viewing trading entity and the quantity available to the trading entity based on available unilateral or bilateral credit. The displayed market book may consist of individual order prices and quantities, aggregated prices and quantities, and/or average prices at predetermined quantities.

BACKGROUND OF THE INVENTION

Automated dealing systems (e.g., for trading currencies, commodities, and the like) are increasingly replacing the conventional manner of dealing using a broker as an intermediary. When a broker is used to complete a transaction, although anonymity of the counterparties is preserved until just prior to the conclusion of the deal, the broker can be relied upon to prevent one party from initiating or accepting a deal with another party with whom, for one reason or another, it does not wish to trade. Removal of such human safeguards has lead to the development of automated checks and validations in the automated dealing systems.

A number of anonymous distributed matching systems currently exist which automatically match offers and bids entered by trading entities and allow trading entities to view the market and choose from among the displayed offers and/or bids. One such system is described in U.S. Pat. No. 5,077,665, wherein a host computer maintains a host book data base including all active bids and offers in the system and distributes a subset of the host book, a keystation book, to the trader keystation. The contents of the keystation books includes an associated depth display range which is dynamically controllable by the host computer. The keystation book is also dynamically updated by transaction update broadcast messages received from the host computer. However, this system does not include any means by which credit availability between parties may be checked.

To accommodate the need for some form of credit checking ability in the distributed matching system disclosed in U.S. Pat. No. 5,077,665, a distributed matching system including a credit checking feature was developed as described in U.S. Pat. No. 5,136,501. The system described in this patent includes a credit feature by which credit availability between parties to a transaction is checked after a trading entity has selected a desired bid or offer and a match has been executed. Prior to sending a confirmation of the transaction to each party, the system performs a bilateral credit check to insure that each party has extended sufficient credit to the other to cover the amount of the transaction.

However, a drawback of the system described in U.S. Pat. No. 5,136,501 is that is does not allow a trading entity to determine whether a displayed bid or offer is actually available in view of bilateral credit extended between the potential counterparties prior to selecting the displayed bid or offer. As a result, the trading entity is unsure whether a displayed bid or offer is really available until after the trading entity has requested the transaction.

One possible solution to this problem is provided in U.S. Pat. No. 5,375,055, wherein each trader's display is pre-screened for compatibility with limited credit information. The limited credit information consists of a one-bit data flag indicating whether a predetermined credit limit between the potential trading parties is available. The system displays to the individual trading entity the best offer and/or bid price available to that trading entity for a predefined quantity based on the trading entity's credit.

However, there are a number of limitations of the system described in U.S. Pat. No. 5,375,055. The system displays only the best prices available to the trading entity. There is no indication of what other bids and offers in the market are available to the trading entity, for example, bids and offers with slightly worse prices and bids and offers for which the quantity is less than the predefined quantity. As a result of the limited display of the system described in U.S. Pat. No. 5,375,055, transparency of the market, i.e., the degree to which trading entities have access to market information, is significantly less than, for example, in the distributed matching system described in the '665 and '501 patents. That is, the trader's display provides significantly less information about the aggregate activity of the market.

In addition, the system described in the prescreening of the display is accomplished using a credit matrix including one-bit flags which indicate whether a party's credit limit has been exceeded. Since the screening function is performed only on this basis and not on the basis of the actual amount of credit available between potential trading parties, the system described in the '055 patent is not capable of generating and displaying some types of desired market information, for example the quantity of an instrument available at a certain price as determined by the amount of credit available between trading parties. This system also fails to perform complex credit calculations wherein multiple credit limits are applied to a single order and/or wherein a single credit limit is distributed among multiple orders.

SUMMARY OF THE INVENTION

In view of the limitations of the distributed matching systems described above, the present invention provides a distributed matching system wherein each trading entity receives a filtered market view display including a predefined number (depth) of available offer and bid prices for one or more particular trading instruments and the quantity available to the trading entity as limited by unilateral and/or bilateral credit availability. To generate this display, a plurality of intelligent nodes filter the bids and offers in the system to determine which offers and bids will be distributed to the individual trader keystations for display to the individual trading entities subject to unilateral and/or bilateral credit availability between the parties. The displayed market view may consist of individual order prices and quantities, aggregated prices and quantities, and/or average prices for predetermined quantities. The system according to the present invention also performs complex credit calculations, for example where a single credit limit is applied to multiple orders or multiple credit limits are applied to a single order. As a result, the system automatically provides individualized information about the activity of the market to the trading entity and performs complex calculations needed to provide a complete view of the potentially complex market options available to each trading entity. Thus, market transparency is significantly increased.

In the system according to the present invention, the depth of the keystation book may be dynamically changed by the host or by the trading entity viewing the market. For example, the host may detect limitations in network bandwidth and therefore provide less information to the keystations for a period of time until more bandwidth is available. Also, the trading entity may choose what book depth he or she wishes to view. The trader's display is also continuously updated as new information, for example, bids, offers, or credit limits, are entered into the system and as credit limits change due to transactions between parties.

In order to provide a individualized, unilaterally or bilaterally credit filtered market view of the order book to each trader keystation, several design problems must be addressed. Two such problems relate to bandwidth constraints and processing constraints. In order to provide a fully filtered view of the market to each trading entity, the amount of information transmitted throughout the system must be managed so as to not exceed the network bandwidth capacity. Furthermore, the vast number of calculations required to continually determine unilateral and/or bilateral credit availability between each potential counterparty in the network as well as aggregated and average prices and quantities must be performed in such as way as to not exceed the processing limitations of the network. Since each trading entity's view of the market is different and must be continually updated as the book of bids and offers in the market changes and as credit limits between parties change, the hardware limitations of providing a dynamically updated, fully-filtered view of the market for multiple financial instruments to multiple trading entities are significant.

One possible way to address these problems is through the use of large high-performance network components. This type of solution will become increasingly feasible as technology advances, and such solutions are not outside the scope of the present invention.

However, such high-performance network equipment is currently expensive, and therefore the present invention may also be implemented more economically using novel techniques which overcome bandwidth and processing constraints while enabling each trading entity to obtain an individualized, unilaterally or bilaterally filtered view of the market for multiple financial instruments. These novel techniques will be described in detail below with reference to the accompanying drawings.

A distributed electronic trading system according to the present invention includes a host for receiving and storing orders for multiple trading instruments and credit information entered by a plurality of trading entities, for transmitting the orders and display parameters, and for selectively transmitting the credit information. The system also includes a plurality of intelligent nodes, each assigned to one or more of the plurality of trading entities, for receiving the orders, selected credit information and display parameters from the host. The intelligent nodes screen the orders using the selected credit information and display parameters to generate and transmit individual market display information for each assigned trading entity. The market display information includes a price and a quantity of the top N available orders for at least one of the trading instruments. The system also includes a plurality of keystations, each associated with a trading entity, for receiving and displaying the individual market display information. The intelligent nodes identify the top orders in the book and determine how many of these top orders must be combined in order to create a standard quantity. The intelligent nodes then calculate the weighted average price of the combined top orders and display the weighted average price as the average price for the standard quantity.

Various additional advantages and features of novelty which characterize the invention are further pointed out in the claims that follow. However, for a better understanding of the invention and its advantages, reference should be made to the accompanying drawings and descriptive matter which illustrate and describe preferred embodiments of the invention.

DETAILED DESCRIPTION

The present invention will now be described with reference to the drawings.

Figure 1:
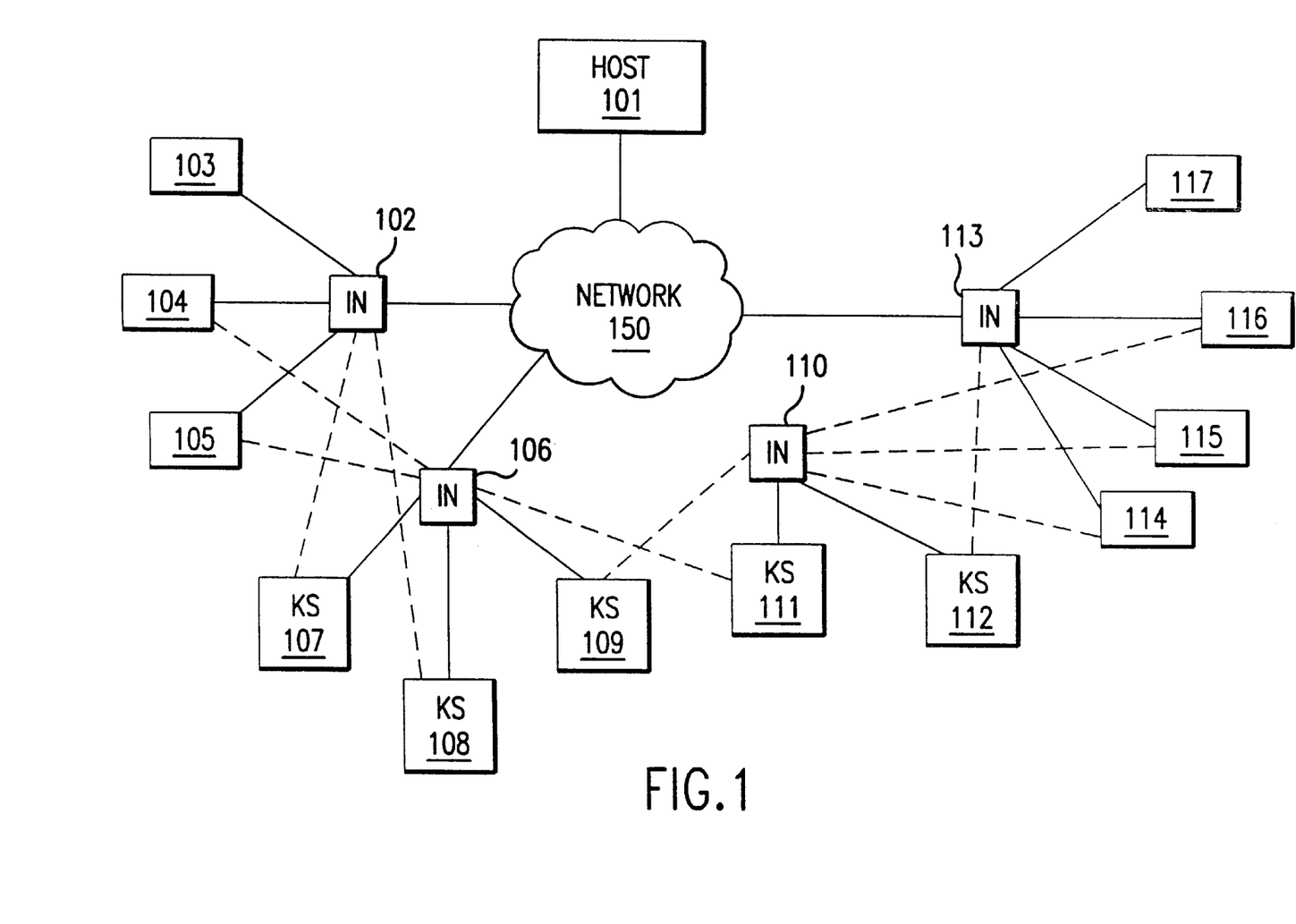
FIG. 1 provides a block diagram of a distributed electronic trading system according to the present invention.

As shown in FIG. 1, a distributed electronic trading system according to the present invention includes a host 101 connected via a communications network 150 to intelligent nodes (INs) 102, 106, 110, and 113. Each IN is respectively connected to multiple keystations (KSs). For example, IN 102 is coupled to KS 103, KS 104 and KS 105, and IN 106 is coupled to KS 107, KS 108, and KS 109. Also, IN 102 is a backup node for KS 107 and KS 108 as indicated by the dotted connections between this node and the keystations. Similarly, IN 106 is a backup node for KS 104 and KS 105. The backup nodes receive all information that is received by the primary nodes and function as primary nodes in the event of a primary node failure. Other primary connections between the network components are shown in FIG. 1 as solid lines, and other backup or secondary connections are designated by dotted lines. While four intelligent nodes and twelve keystations are shown in FIG. 1 for description purposes, the system according to the present invention contemplates the use of a large number of nodes and keystations located remotely from one another, for example, in different cities and countries. All of the components of the system according to the present invention are linked via communications network 150 which may be configured in numerous well-known formats and enables two-way communication between the components of the network. Furthermore, the host 101 may be combined into a central host computer or may be distributed between multiple components within the network.

The host 101 maintains a central order book in which information regarding all currently available bids and offers (collectively referred to as "orders") for all available trading instruments are stored. When trading entities enter bids and offers at their respective KS, the bids and offers are transmitted via the IN connected to the KS to the host 101. In this way, the host 101 collects the information needed to create and maintain the central order book.

The host 101 also maintains all credit information from each trading entity. Prior to and/or during trading activities, each trading entity enters credit information into the trading entity's respective KS. The credit information entered by each trading entity includes an amount of credit that the trading entity is willing to extend to other individual trading entities and groups of trading entities on the system for one or more types of trading instruments. Once a trading entity has entered credit information into its respective KS, the KS transmits the credit information to host 101 via its respective IN and network 150. Thus, the host 101 receives and stores a complete credit profile for all trading entities on the system. For example, a complete credit profile for trading entities A, B, C, and D may be as follows:

| Trading entity | A    | B    | C    | D    |
|----------------|------|------|------|------|
| A              | —    | 2 M  | 10 M | —    |
| B              | 20 M | —    | 3 M  | 5 M  |
| C              | 5 M  | 15 M | —    | 20 M |
| D              | 1 M  | —    | 3 M  | —    |

In the credit table shown above, trading entities A, B and C have entered credit information for the other three respective-trading entities, indicating the total amount of credit each trading entity is willing to extend to the three other trading entities. Trading entities may modify these credit limits at any time before or during trading activities. Each trading entity may also create group credit limits by which the trading entity may limit the amount of credit it is willing to extend to a group of potential counterparties as a whole in addition to the individual limit set for each member of the group. For example, trading entity A may define a group of trading entities, "Group 1", as including trading entities B, C and D and limit the total amount of credit extended to the trading entities in Group 1 as a whole for each financial instrument. Thus, matching of instruments by the host may be affected by multiple credit limits such that the system limits the matches based upon the lowest applicable amount of available credit between the counterparties to the transaction.

Subsequent changes made by trading entities to their credit information are also forwarded to the host 101 in the form of directed messages to insure that the credit information maintained in the host 101 is always current. Also, as trading progresses and trades are executed between trading entities, the host 101 automatically updates its credit profile for the affected trading entities accordingly.

The intelligent nodes (INs) receive both order book and credit information from the host on a continuous basis. The INs use this information to perform the calculations necessary to generate a unilaterally and/or bilaterally credit-filtered view of the market for each of its assigned KSs. By structuring the network in this way, the vast number of calculations needed to generate a unilaterally and/or bilaterally filtered market view for each individual trading entity is distributed throughout the network, thereby reducing the processing requirements for any individual component.

Each IN receives from the host 101 the full order book and a subset of the credit profile stored in the host 101. The credit information subset includes all information that the IN needs to determine both unilateral and bilateral credit availability between its assigned KSs and other potential counterparties in the system. Thus, the full bilateral credit model for each trading entity, including real credit values in real time, is transmitted from the host 101 to each IN.

The host 101 may also limit the credit information provided to each IN, for example, by using a "credit threshold." The credit threshold only applies to the credit extended to a particular trading entity. According to one embodiment of the present invention, the credit threshold is determined by 1) identifying the largest numerically displayable quantity for each base currency; 2) converting this amount into a common instrument such as U.S. dollars; and 3) identifying the largest of such amounts for all currency pairs. This largest amount becomes the credit threshold and is used to limit the credit information that is provided from the host 101 to the IN.

The credit threshold is chosen to restrict or limit network traffic by reducing the number of updates required to maintain a current market display. Since no updates are needed when available credit between parties changes from one amount above the threshold value to another amount above the threshold value, the credit threshold value determines the number of updates that must be transmitted through the network. Absent the credit threshold feature, every change in credit availability between trading entities would necessitate an update message from the host to the affected INs.

Figure 2:
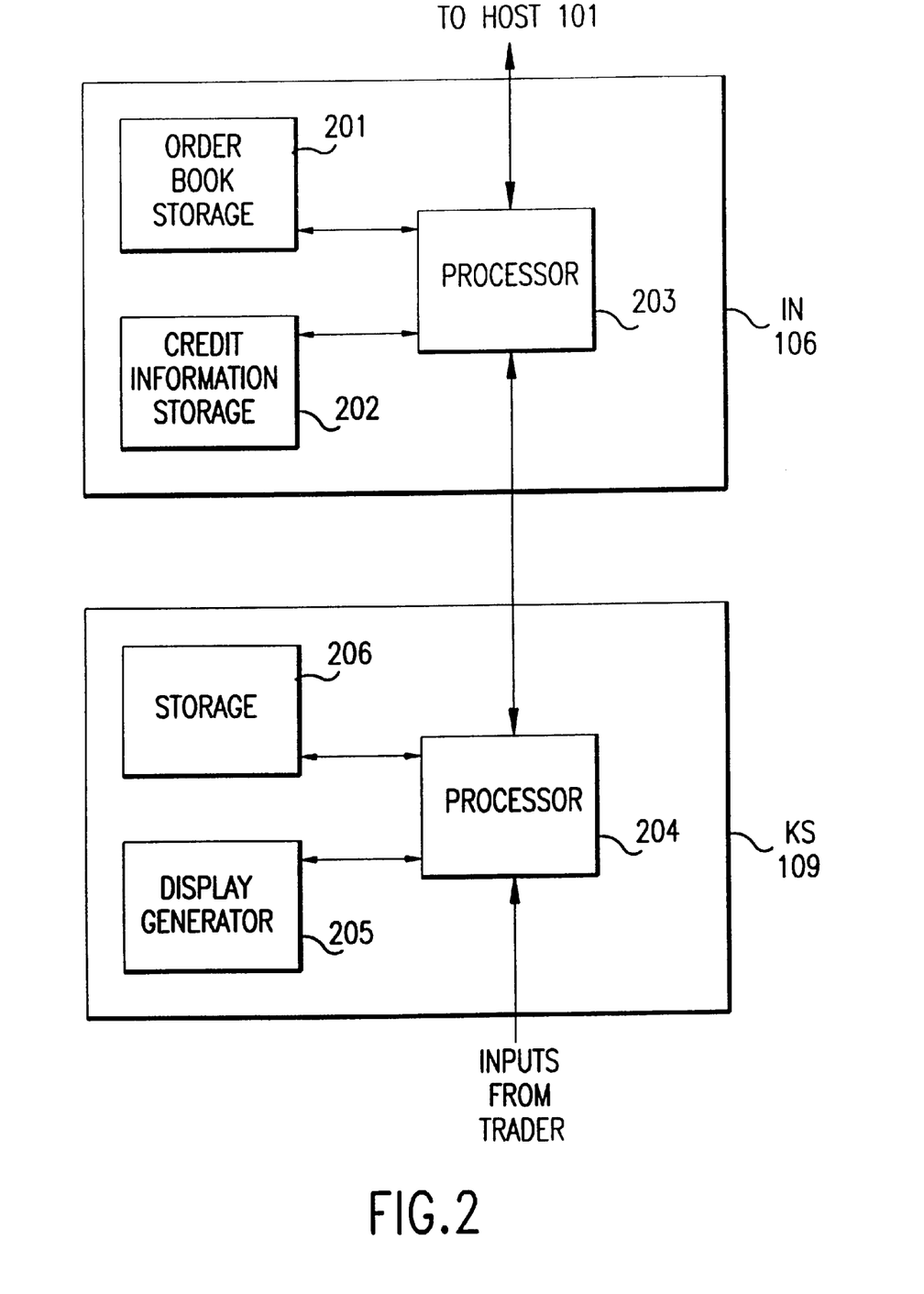
FIG. 2 provides a block diagram of an intelligent node (IN) and a keystation (KS) in the distributed electronic trading system of FIG. 1.

With reference to FIG. 2, the IN 106 receives order book information and the credit information from the host for each of its assigned KSs. This information is respectively stored in storage units 201 (order book storage) and 202 (credit information storage). A processor 203 in IN 106 then generates display information which will enable each of its assigned KSs to display a unilaterally and/or bilaterally credit filtered view of the market (i.e., a predetermined depth of credit-filtered orders) for one or more trading instruments selected by each trading entity. This filtered view enables trading entities to determine what trades are available to them in the market at any given time based upon credit they have extended to others and/or credit others have extended to them. This view of the market is dynamically updated by processor 203 as the order book and credit limits change in the course of trading activities.

Each trading entity has its own trading entity terminal. An exemplary trading entity terminal is KS 109. KS 109 includes a processor 204, a display generator 205, and a storage unit 206. The KS receives from its respective IN 106 display information such as market display information, current top of the book information, last trade price information, and credit filtered information as calculated by the IN. The processor 204 provides this information to display generator 205 along with message protocol conversion information received from the IN (which enables the KS to format its display screen correctly) to generate a personalized market view display for the trading entity. However, the KS does not perform any credit-related calculations, nor does it receive counterparty credit information from the host 101 or respective IN. This prevents individual trading entities from obtaining sensitive credit information entered into the system by other trading entities and maintains absolute anonymity between potential counterparties to a transaction until they have decided to proceed with the transaction.

Figure 3:
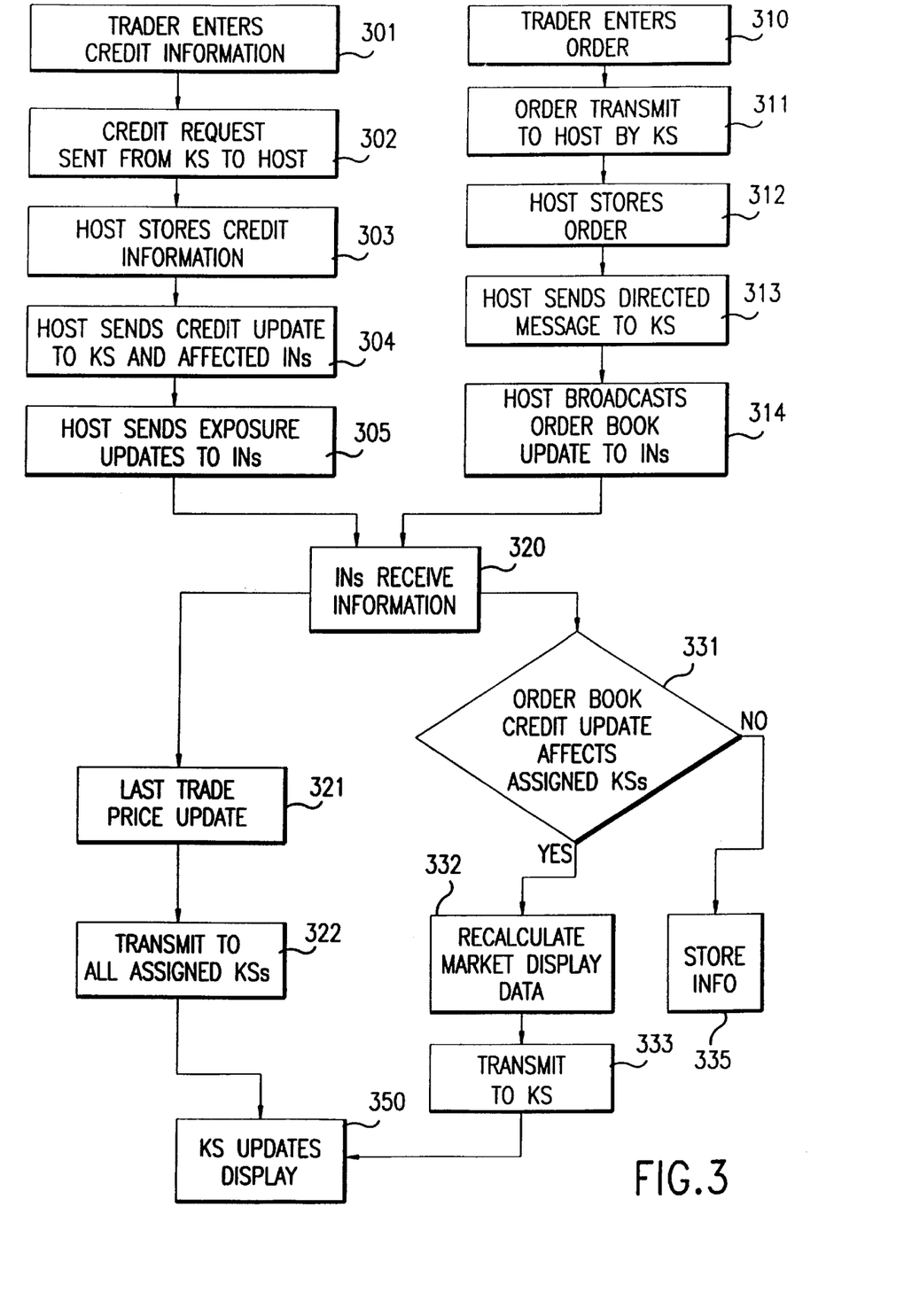
FIG. 3 provides a functional block diagram of the operation of the distributed electronic trading system of FIG. 1.

The operation of the distributed matching system according to the present invention will now be described in detail with reference to FIG. 3. The following description assumes that all trading entities on the system are trading in a single market, for example, the USD to FRF foreign exchange market. However, the system according to the present invention enables some trading entities on the system to trade in one market while other trading entities trade in other markets. Further, information from a plurality of different markets may be displayed to each trading entity simultaneously, enabling the trading entity to easily move between markets and monitor market information from a number of different markets simultaneously. Nonetheless, for simplicity of description, activity within a single market is described below.

Initially, each trading entity enters credit information, including definitions of credit groups and credit limits between the trading entity and each group and individual trading entity (Step 301). Upon receiving this information entered by the trading entity, the trading entity's KS transmits a "credit request" to the host 101 by which the credit information entered by the trading entity is transmitted to the host 101 (Step 302). The host 101 stores this information (Step 303) and generates a "credit update" message which is transmitted to the KS and "echoed" to the INs which are affected by the new credit information, including both primary and backup INs (Step 304).

In addition to credit update messages transmitted from the host to the INs, the INs also receive from the host 101 exposure updates which contain updates regarding credit extended by other trading entities to the trading entities services by the particular IN (Step 305). These exposure updates are only transmitted to the INs which serve trading entities affected by the changes in credit. Furthermore, the exposure updates do not include credit information that has not changed, but only that information which has changed from one value above or below the credit threshold to another value below the credit threshold. As a result, the amount of redundant or unnecessary credit information transmitted through the network is minimized. This sequence of steps (301–305) may be repeated any number of times both before and during the trading process.

When a trading entity first logs into the network, the IN corresponding to the KS of the trading entity requests information about the trading entity from the host 101. The host 101 transmits to the IN group credit information, credit values, and exposure information corresponding to the trading entity.

Notably, if the system is disabled for a period of time, upon restarting of the network, each IN compares the sequence number associated with the update or other message it receives from the host 101 with the last sequence number it has stored. If the sequence numbers match, the IN does not need the update information. If not, the IN requests sufficient information to synchronize itself with the host 101. In this way, the system according to the present invention resynchronizes itself following a network failure or shutdown.

The INs initially receive the full order book from the host 101, including information on all bids and offers for all available trading instruments in the market and characteristics of each instrument, such as how an instrument is quoted, how many digits are used, and the small, medium and large thresholds for each instrument. Subsequently, the INs receive credit updates, order book updates, and exposure updates as they are needed, i.e., if they potentially affect the market view of one or more trading entities serviced by a particular IN. Further, only new information is transmitted in the updates, reducing the amount of redundant information transmitted over the network 150.

When the INs receive the full download (the full order book and selected credit information relating to the IN's assigned KSs) from the host 101, the INs separate the bids and offers out of the download received from the host 101. The INs then transmit to the KSs only the display data they need to display the individual trading entity's market view and not the full order book. As the order book changes, the host 101 broadcasts order additions, modifications, and deletions to all of the INs. The information for each order includes a randomly-assigned subscriber identification code which enables each IN to identify the subscriber who owns the order. To screen the order for credit availability, each IN performs the mapping between the subscriber and the relevant credit information using the subscriber identification code. The subscriber identification codes are not transmitted to the KSs and are randomly determined at periodic intervals to insure confidentiality and anonymity between the trading entities on the system.

According to one embodiment of the present invention, the host 101 transmits two types of messages. First, the host sends directed messages which are addressed and delivered to a particular KS or IN, e.g., credit updates and exposure updates. Second, the host sends broadcast messages which are delivered to all INs, e.g., order book updates. The INs determine whether to send the broadcast message on to each KS in an unmodified or modified format, or not at all.

For example, if the host 101 receives an order, the host sends a directed response to the KS of the trading entity which entered the order. Then, the host broadcasts an order book update message to all INs. The INs receive the message (Step 320), enter the new order into their order books, and, for each of its KSs, determines if the new order affects the trading entity's market view (Step 331). If so, the IN recalculates the market display data for the KS (Step 332) and transmits an update message to the KS which tells the KS to update its display of the market (Step 333). If the message from the host 101 to the INs is a last trade price message, this message is transmitted from the IN to its respective KSs in the form of a new message because this information changes all trading entities' market displays (Steps 321, 322).

According to one embodiment of the present invention, the INs are transparent to the KSs, meaning that the KSs are not aware that the INs receive, filter, and reformat the information transmitted by the host 101. Therefore, to the KSs, the messages which are actually transmitted by the INs appear to originate from the host 101.

Upon entry of an order by a trading entity (Step 310), the host 101 sends directed message to KS entering the order (Step 313). Subsequently, the host 101 broadcasts the order book modifications in the form of order book updates to all INs (Step 314). According to one embodiment of the invention, the host 101 does not transmit a separate message for each addition, modification, and deletion in the order book, but instead only broadcasts the net results of all order book modifications. This process is completed within a predetermined period of time, preferably less than one second.

When an IN receives the order book update or updates from the host 101 (Step 320), the IN determines if market view of any of its KSs is affected by the changes to the order book (Step 331). If so, the IN recalculates the market display data for the affected KSs (Step 332) and transmits the update to the affected KSs (Step 333). To determine whether their KSs will be affected by the update, the INs store a "book depth value" which restricts screening of the order book to a predefined depth, for example, a depth of six, such that only the top six individual orders, aggregated price levels, or average price levels in the market will be displayed for each instrument (depending on the display mode selected by the trading entity). As a result, the update will only require the IN to prescreen the order book and update the KS display if the change to the order book is within the defined book depth value and the potential counterparties to the transaction have unilateral or bilateral credit (depending on the screening mode selected by the trading entity).

The system according to the present invention may provide at least three different personalized market view displays to each KS: a market view consisting of individual orders, a market view consisting of aggregated orders, and/or a market view consisting of average price orders for quantities defined by the trading entity or the system. For example, assuming that the book depth is six, an individual order market view displays to the trading entity the six top orders (best-priced orders in price-time priority) in the market book and the quantity of each order available to the trading entity based upon unilateral or bilateral credit availability as selected by the trading entity. An aggregated market view displays the top six order prices available to the trading entity and the aggregate quantity available at each price. All orders available to the trading entity at each displayed price level are aggregated, such that the displayed quantity may include available quantities from one or more orders. The availability of order and quantities is determined by the IN based upon unilateral or bilateral credit availability (depending on the trading entity's credit filtering selection). An average price order market view displays the average order price available to the trading entity for one or more quantities defined by the trading entity or the system. For example, if the trading entity wants to determine what he/she would pay for quantities of 5 million, 10 million, 15 million and 20 million, the IN attempts to fill these quantities using available orders in the market book. The IN identifies the best available order and the corresponding available quantity, the next-best available order and corresponding available quantity, and so forth until the quantity requested by the trading entity is filled. The IN then calculates the weighted average of the prices of the orders it has used to fill the requested quantity and provides this display information to the trading entity KS. The KS displays the average price to the trading entity. The IN repeats this process for each quantity requested by the trading entity.

In an alternative embodiment of the average price display, the system may pre-configure the quantity level or levels available for this function. These pre-configured quantity levels are standard quantities as described earlier in the disclosure. For example, the system may only allow an average price display of standard quantities of five million or ten million.

In order to generate display data corresponding to the top six orders, price levels (aggregated orders) or average prices, the IN may have to search through substantially more than six orders and/or price levels in the market book. In other words, the IN continues the order screening process until it has derived enough information to complete the display levels as defined by the book depth.

An additional display option enables each trader to view his/her own orders and/or orders entered by other traders in the same trading entity. If a trader selects this display option, the trader's KS displays these orders and indicates that the displayed orders are the trader's own or orders entered by other traders in his/her trading entity, for example, by displaying these orders in a particular color different from other displayed orders or marking such orders with a symbol such as an asterisk. The trader's own orders and orders entered by other traders in his/her trading entity may be displayed integrally with other orders as part of the trader's market view or in a separate area on the KS display screen.

The functionality of the INs will now be described in greater detail. In each IN, each trading instrument is statically associated with two numbers: a minimum quantity and a standard quantity. The minimum quantity represents the minimum order size for the particular trading instrument that will be processed and displayed by the system. The standard quantity is by definition greater than or equal to minimum quantity. For screening purposes, the standard quantity is used to show a trading entity a price at which it can get a larger quantity of orders.

When an IN screens the order book for a minimum quantity, the respective KS displays to the trading entity the best price at which it can trade a particular instrument and the total quantity available at that price. For example, assume that trading entity A and trading entity B have each entered an order into the system for a quantity of 5 million at the price of 1.5 USD-FRF, such that the total quantity of both orders is 10 million. Trading entity C who wants to trade with A and B has $4M worth of bilateral credit with trading entity A and $4M worth of bilateral credit with trading entity B. If the minimum quantity is 1, the available quantity displayed to the trading entity will be 8.

When an IN screens an order book for standard quantity, the IN determines the best price at which the trading entity can buy or sell the standard quantity. For example, if the standard quantity is 5 million, the KS will display the price at which the trading entity can trade a quantity of 5 million or more based upon the trading entity's credit availability. Notably, to obtain a standard quantity such as 5 million on an instrument pair that has a minimum quantity of 1 million, the IN may identify multiple orders at the same price or multiple orders at different prices. Therefore, if the IN identifies 1 million of one order and 4 million of another order, the KS will display the weighted average price of these orders to the trading entity.

Thus, when the order book is screened for a minimum quantity, the KS will not display an average price as long as the minimum screening quantity is equal to (or less than) the minimum allowable order size (if the minimum quantity for an instrument is greater than the minimum allowable order size, the KS will display average prices). However, when the IN screens for a standard quantity, an average price may be displayed.

The processing described above for detecting the average price of the standard quantity is also utilized to calculate the book of average prices requested by the user or configured by the system. In this case, the IN continues to select orders based on credit availability until all requested quantity levels have been filled or until no orders remain.

In some markets, trading entities may desire to enter larger orders and restrict the filling of the orders to a certain quantity to avoid filling of the larger order in a piecemeal fashion. In other words, the trading entity entering the large order wants a large ticket instead of multiple small tickets to fill the order. This function may be provided through the use of a minimum ticket option which a trading entity may elect when entering an order. For example, a trading entity may enter an order for a quantity of 20 million with the stipulation that the order can only be "done" or filled by a reciprocating order for a quantity of 20 million. This order is said to require a minimum ticket of 20 million.

When such an order is entered into the order book, the INs must take the minimum ticket requirement into account during the credit screening process when generating market display data. According to one embodiment of the present invention, to accommodate minimum tickets, the following rule may be used by the INs during screening of the order book: if, in order to show a better prescreened price, a minimum ticket order must be included, the displayed prescreened price is not weighted price (including part of the minimum ticket order) but instead just the price of the minimum ticket order. For example, during screening of the order book for a standard quantity of 5, if an IN identifies two unrestricted orders (e.g., one with a quantity of 2 and one with a quantity of 3 or more) that meet the standard quantity, the KS will display the weighted average price of those two orders. On the other hand, if the IN identifies the order of the best price having a quantity of 1 and the order of the second best price that has a quantity of 5 and a minimum ticket requirement of 5, the KS will not display the weighted average of the best order and part of the second best order, but instead only the price of the second best order. As a result, a trading entity may see a worse price as a result of a minimum ticket requirement than when a trading entity wants a standard quantity.

The credit availability filtering or screening function performed by the INs in the system according to the present invention includes both unilateral and bilateral credit availability screening. Each trading entity may choose to view 1) bilaterally credit filtered prices and quantities (orders for which both parties to the potential transaction have extended credit to one another and the quantities of those orders available based upon the lower of the applicable credit limits), 2) the prices of those orders entered by other trading entities to whom the viewing trading entity has extended credit (regardless of whether the other trading entities have extended credit to the viewing trading entity) and the quantities of those orders available based upon the unilaterally extended credit, and/or 3) the prices of orders entered by other trading entities who have extended credit to the viewing trading entity (regardless of whether the viewing trading entity has extended credit to the other trading entities) and the quantities of those orders available based upon the unilaterally extended credit.

The viewing trading entity may select one or more of these credit filtering options. According to one embodiment of the system of the present invention, the trading entity's market view may include bilaterally screened prices and quantities in one color, unilaterally screened prices and quantities where the viewing trading entity has extended credit in a second color, and unilaterally screened prices and quantities where the other trading entities have extended credit in a third color. Orders entered by the viewing trading entity or members of the viewing trading entity's credit group may optionally be displayed in a fourth color. However, in most markets, the trader's own orders and those of his trading entity are not considered by the IN in the bilateral and unilateral credit screening process. In other embodiments of the present invention, the market view display includes only bilaterally or unilaterally filtered orders and quantities. Thus, the credit filtering functions selected by the viewing trading entity determine how order availability (both available prices and quantities) are determined by the INs and what information is subsequently displayed to the trading entity.

As discussed above, trading entities may enter individual and group credit limits, both of which are used by the INs in the credit filtering process. As a result, a single order may be subject to two or more credit limits, for example, an individual credit limit and a group limit extended by each potential party to the transaction. Therefore, the respective INs must determine the lowest of the applicable credit limits to calculate which orders/price levels to display in each trading entity's market view and the corresponding available quantities. The INs must also temporarily deplete each applicable credit limit upon displaying an order. This ensures that all displayed orders on a single side (bid or offer) of a book in a single currency are simultaneously available to the trading entity. Otherwise, the trading entity does not receive an accurate view of what is currently available to him or her.

The credit availability filtering function performed by the INs also takes into account the possibility of multiple orders to which a single credit limit is applied. For example, if trading entity A has a $10M credit limit with trading entity B and trading entity B enters an order at the best market price for a quantity of 8 million, trading entity A will see in its market view the best price and an available quantity of 8 million. If trading entity B enters a subsequent order at the second-best market price for a quantity of 5 million, trading entity A will only see a quantity of 2 million available at the second-best price. Again, the fact that an order is displayed temporarily depletes the parties' credit lines available for screening purposes.

A similar process is applied for group credit limits. All orders entered by members of a group must be aggregated so that the group credit limit can be applied. Additionally, the individual credit limits of each group member must also be considered in determining the availability of order prices and quantities. When an order that is subject to both a group limit and an individual limit is displayed in a trading entity's market view, both the group and individual credit limits applicable to the displayed order are temporarily depleted by the respective INs for credit filtering purposes.

Thus, the distributed matching system according to the present invention calculates unilaterally and/or bilaterally prescreened values for all instruments available in the market or for those instruments selected by a subscriber. The instruments available in the market may be downloaded from the host 101 to the KSs in the form of a static list from which the trading entities may select. In this way trading entities may select the instruments for which they want to receive dynamic updates and prescreened market displays.

While the present invention has been particularly described with reference to the preferred embodiments, it should be readily apparent to those of ordinary skill in the art that changes and modifications in form and details may be made without departing from the spirit and scope of the invention. It is intended that the appended claims include such changes and modifications.

We claim:

1. A distributed electronic trading system, comprising:
   a host for receiving and storing orders for multiple trading instruments and credit information entered by a plurality of trading entities, for transmitting said orders and display parameters, and for selectively transmitting said credit information;
   a plurality of intelligent nodes, each assigned to one or more of the plurality of trading entities, for receiving said orders, said selected credit information and said display parameters from said host, said intelligent nodes comprising means for screening said orders using said selected credit information and said display parameters to generate and transmit individual market display information for each said assigned trading entity, said market display information including a price and a quantity of the top N available orders for at least one of said trading instruments; and
   a plurality of keystations, each associated with a trading entity, for receiving and displaying said individual market display information.

2. A distributed electronic trading system according to claim 1, wherein said selected credit information includes bilateral credit availability between an individual trading entity and potential counterparties as determined by said orders in the system, thereby enabling the trading entity to view bilaterally credit filtered individual market display information.

3. A distributed electronic trading system according to claim 1, wherein said selected credit information includes bilateral credit availability between an individual trading entity and potential counterparties as determined by said orders in the system, thereby enabling the trading entity to view unilaterally credit filtered individual market display information.

4. A distributed electronic trading system according to claim 1, wherein N is more than 1.

5. A distributed electronic trading system according to claim 1, wherein said host provides update messages to said intelligent nodes including credit information and order updates, thereby enabling said intelligent nodes to generate and transmit updated display information to said keystations in real time.

6. A distributed electronic trading system according to claim 1, wherein each said intelligent node includes means for determining the top N orders for a standard quantity such that one or more of said top N orders may be a combination of two or more orders in the system and have a price that is a weighted average of prices from said two or more orders.

7. A distributed electronic trading system according to claim 1, wherein said credit information includes monetary credit limits extended by each trading entity to one or more potential counterparties.

8. A distributed electronic trading system according to claim 1, wherein said credit information includes individual and group monetary credit limits extended by each trading entity to one or more potential counterparties.

9. A distributed electronic trading system according to claim 1, wherein said host selects the credit information to be transmitted to each of said plurality of intelligent nodes using a credit threshold value to limit the number of update messages transmitted from the host to the intelligent nodes.

10. A distributed electronic trading system for displaying a real-time credit filtered view of at least one market in which financial instruments are traded, said market view including a predetermined number of orders currently available to a viewing trading entity based upon one or more credit limits entered by the viewing trading entities and/or other trading entities in the system, each said order having an associated price and quantity, said system comprising:
   a host for receiving and storing orders and credit information entered by a plurality of trading entities including the viewing trading entity, for transmitting said orders and predetermined display parameters, and for selectively transmitting said credit information;
   a plurality of intelligent nodes linked to said host, each said node assigned to at least one trading entity and comprising a credit information storage unit for storing said selected credit information, an order book storage unit for storing said orders and said display parameters, and a processor for generating real-time credit filtered market view display information for each assigned trading entity,
   wherein said real-time credit filtered market view display information includes said predetermined number of unilaterally and/or bilaterally credit filtered orders and corresponding available quantities; and
   a plurality of keystations, each associated with a trading entity, for receiving and displaying said real-time credit filtered market display information.

11. A distributed electronic trading system according to claim 10, wherein each said unilaterally and/or bilaterally filtered order consists of a single order entered by a trading entity.

12. A distributed electronic trading system according to claim 10, wherein each said unilaterally and/or bilaterally filtered order consists of the aggregate of all available orders of the same price entered into the system.

13. A distributed electronic trading system according to claim 10, wherein each said unilaterally and/or bilaterally filtered order consists of an average price for a predetermined quantity defined by the viewing trading entity.

14. A distributed electronic trading system according to claim 10, wherein said selected credit information includes bilateral credit availability between a trading entity assigned to an intelligent node and all potential counterparties of the assigned trading entity in the system.

15. A distributed electronic trading system according to claim 10, wherein said selected credit information includes monetary credit limits extended by each trading entity to one or more potential counterparties.

16. A distributed electronic trading system according to claim 10, wherein said selected credit information includes individual and group monetary credit limits extended by each trading entity to one or more potential counterparties.

17. A distributed electronic trading system according to claim 10, wherein said host selects the credit information to be transmitted to each of said plurality of intelligent nodes using a credit threshold value to limit the number of update messages transmitted from the host to the intelligent nodes.

18. A distributed electronic trading system according to claim 10, further comprising a user-selectable option for enabling a trader in a first trading entity to view the trader's own orders and/or orders entered by one or more other traders in the first trading entity.

19. A distributed electronic trading system according to claim 18, wherein the trader's own orders and/or orders entered by one or more other traders in the first trading entity are displayed with a corresponding visual indicator to indicate that the orders are the trader's own and/or were entered by one or more other traders in the first trading entity.

20. A distributed electronic trading system according to claim 10, wherein:
   said unilaterally credit filtered orders and corresponding available quantities are displayed with a first visual attribute; and
   said bilaterally credit filtered orders and corresponding available quantities are displayed with a second visual attribute.

21. A trading system operable to store and provide order information to a plurality of trading entities comprising:
   a central computer operable to store (1) a plurality of orders for at least one trading instrument, said orders entered by a plurality of trading entities and (2) credit information for said plurality of trading entities connected to the trading system and further operable to transmit a subset of the stored credit information and said plurality of orders;
   a plurality of intelligent nodes, each assigned to one or more of the plurality of trading entities and operable to receive said plurality of orders and said subset of the stored credit information and each intelligent node including a processor generating, using said subset of credit information, said plurality of orders and display parameter information, real-time credit filtered market view display information for each assigned trading entity,
   wherein said real-time credit filtered market view display information includes a predetermined number of unilaterally and/or bilaterally credit filtered orders and corresponding available quantities; and
   a plurality of keystations, each associated with one of said assigned trading entities, for receiving and displaying said real-time credit filtered market display information.

22. The trading system of claim 21, wherein said subset of said credit information includes unilateral and/or bilateral credit availability between at least one of said assigned trading entities and potential counterparties.

23. The trading system of claim 22, wherein said central computer identifies said subset of credit information using a credit threshold.

24. The trading system of claim 23, wherein said host computer determines said credit threshold by (1) identifying a largest numerically displayable quantity for each trading instrument; (2) converting said quantity into a common instrument; and (3) identifying a largest numerically displayable quantity for the common instrument.

25. The trading system of claim 21, wherein one of said plurality of trading entities viewing said displayed real-time credit filtered market display information selects said display parameter information, said display parameter information including one or more of bilaterally credit filtered prices and quantities; prices for orders from said plurality of orders entered by trading entities other than said viewing trading entity and quantities for said orders based upon unilaterally extended credit; and prices for orders entered by other trading entities who have extended credit to said viewing trading entity and the quantities of those orders based upon unilaterally extended credit.

26. The trading system of claim 21, wherein each of said predetermined number of unilaterally and/or bilaterally credit filtered orders consists of a single order entered by one of said plurality of trading entities.

27. The trading system of claim 21, wherein each of said predetermined number of unilaterally and/or bilaterally credit filtered orders consists of the aggregate of all available orders of the same price entered into the system.

28. The trading system of claim 21, wherein each of said predetermined number of unilaterally and/or bilaterally credit filtered orders consists of an average price for a predetermined quantity defined by a trading entity viewing said real-time credit filtered market display information.

29. The trading system of claim 21, wherein said subset of credit information includes bilateral credit availability between a trading entity assigned to an intelligent node and all potential counterparties of the assigned trading entity in the system.

30. The trading system of claim 21, wherein said subset of credit information includes monetary credit limits extended by each trading entity to one or more potential counterparties.

31. The trading system of claim 21, wherein said subset of credit information includes individual and group monetary credit limits extended by each trading entity to one or more potential counterparties.

* * * * *